PIEZOELECTRIC TRANSDUCER ELEMENT

Filed Nov. 4, 1968 2 Sheets-Sheet 1

Dec. 8, 1970 W. CRASTER 3,546,497

PIEZOELECTRIC TRANSDUCER ELEMENT

Filed Nov. 4, 1968 2 Sheets-Sheet 2

United States Patent Office 3,546,497
Patented Dec. 8, 1970

3,546,497

PIEZOELECTRIC TRANSDUCER ELEMENT

William Craster, Ilford, Essex, England, assignor to The Plessey Company Limited, Ilford, England, a British company Filed Nov. 4, 1968, Ser. No. 772,992
Claims priority, application Great Britain, Nov. 8, 1967, 50,825/67
Int. Cl. H02v 7/00
U.S. Cl. 310—8.2 2 Claims

ABSTRACT OF THE DISCLOSURE

A hybrid transducer comprising a ceramic piezoelectric disc secured to a circular base plate of a container-like support structure having a thin cylindrical wall or flange by means of which the base plate which carries the piezoelectric disc is mounted, thereby to provide a transducer affording high conversion efficiency.

This invention relates to transducers and more particularly it relates to transducers of the kind which incorporate a piezoelectric element.

Transducers of this kind commonly utilise a so-called ceramic bimorph element which consists of two piezoceramic wafers bonded together and having their outer surfaces metallised to define a pair of electrodes. When a potential is applied between the electrodes, one element expands and the other contracts thereby producing a bending effect similar to that of a bi-metal strip, and when the polarity of the applied potential is reversed the direction of bending is reversed. Thus when an alternating potential is applied between these electrodes the ceramic elements are placed in an alternating electric field which causes them to vibrate at the frequency of the applied alternating potential. Conversely, if the bimorph element is caused to vibrate mechanically, for example by sound waves, an alternating potential having a frequency which corresponds to the sonic vibration frequency is produced between the electrodes. The use of a bimorph element in transducer application does however have certain attendant disadvantages, not the least of which is its inefficiency of operation for the conversion of electrical to mechanical energy when mounted in a support structure. The reason for this operational inefficiency stems from the fact that a support structure has a damping effect on an associated bimorph element and consequently a large proportion of the mechanical energy is absorbed by the support structure. There is therefore a requirement for a piezoelectric element which affords good operational efficiency when mounted on a support structure.

According to the present invention we provide for use in a transducer, a piezoelectric device hereinafter called a hybrid device comprising a piezoelectric element bonded to an electrically conductive supporting structure of similar thickness as the said element which defines one electrode of the device, the other electrode of the device being defined by an electrically conductive surface coating, positionally remote from said support structure, formed on the piezoelectric element.

According to one contemplated embodiment of the invention a hybrid device may comprise a piezoelectric ceramic element bonded to a metallic plate, which defines one electrode of the device, and forms the bottom of an open ended container like structure the other electrode being defined by a metallic coating formed on the said element remote from the metallic plate, the said structure having a side wall preferably adapted to facilitate resilient mounting of the device on a body structure. The side wall of the container-like structure may be formed substantially perpendicular to the metallic plate and may be adapted for resiliency when secured to the body structure by the inclusion of cuts or slots. The wall of the container-like structure may be fabricated in the general form of a hollow cylinder closed at one end by the bottom plate and having the cuts or slots formed therein perpendicular to the bottom plate and extending from the junction of the wall therewith. A piezoelectric ceramic element may be bonded to the bottom plate on the inside or on the outside of the container-like structure or alternatively one such element may be bonded to each side of the bottom plate. The wall of the container-like structure may be relatively thin in the region of its junction with the bottom plate but at the end thereof remote from the bottom plate the wall may be thicker and include means, for example holes, to facilitate fixture of the device to the body structure as by means of screws.

An exemplary embodiment of the invention will now be described with reference to the accompanying drawings in which FIG. 1 is a sectional side elevation of a hybrid device according to the invention;

Figure 1:
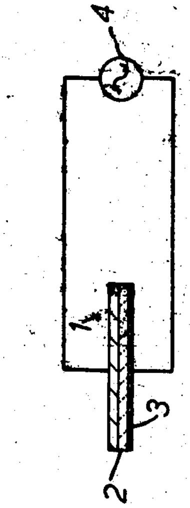

The hybrid device shown in FIG. 1 consists of a metal base plate or diaphragm 1 to one face of which a piezoceramic wafer 2 is bonded, the opposite face of the wafer being coated with a metal layer 3. When the diaphragm 1, which constitutes one electrode of the device, and the metal coating 3 which constitutes the other electrode of the device are connected to an A.C. source 4, the device vibrates at the frequency of the applied alternating current.

Figure 2:
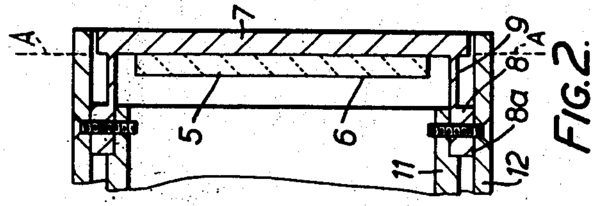
FIG. 2 is a sectional side elevation of a hybrid device mounted on a supporting structure to form part of a transducer.
Figure 3:
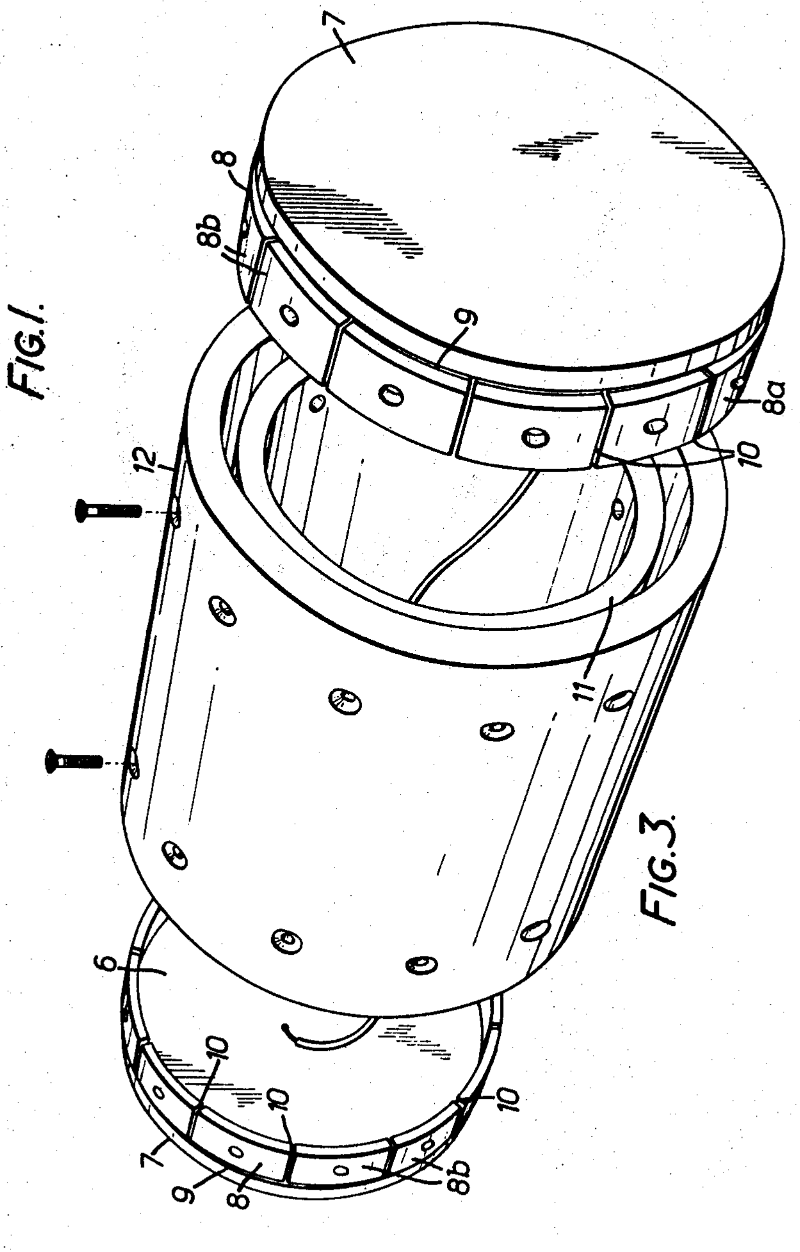
FIG. 3 is a perspective view of a transducer incorporating two hybrid devices each mounted as shown in FIG. 2.

Referring now to FIG. 2 and FIG. 3 wherein corresponding parts bear the same numerical designations a transducer utilises two hybrid devices only one of which is shown in FIG. 2, each comprising a ceramic disc 5 having a pair of electrodes respectively defined by a metal coating 6 carried on one flat surface thereof and a metallic diaphragm 7 to which its other flat surface is bonded. The diaphragm 7 is in the form of a disc of slightly larger diameter than the piezoceramic disc 5 and forms the base of a container-like structure having a side wall 8 of generally cylindrical configuration formed integrally with it. The piezoceramic disc 5 is arranged concentrically with respect to the inside of the wall 8 and is bonded to the flat surface of the diaphragm from which the wall 8 extends. The outside surface of the side wall 8 is concentric with the diaphragm 7 and has a slightly smaller diameter than the diaphragm 7 in the region of its junction therewith. The end of the wall 8 remote from the diaphragm has a slightly larger diameter so as to define an annular groove 9 on its outer surface. In order to promote good operational efficiency of the device the wall 8 at the root of the groove 9 is made relatively thin and cuts 10 (shown only in FIG. 3) are formed in the wall 8 at regular intervals around its circumference which extend along its axial length perpendicular to the surface of the diaphragm 7 to produce a castellated effect. As shown in FIG. 3, a hole is provided in each segment *8b* of the wall 8 at its thick end *8a* to facilitate its fixture to an inner hollow cylindrical shell 11 the outer surface of which extends within the wall 8 to the limit of its thick portion *8a* and to a hollow cylindrical outer shell 12 which fits over and in contact with the outside surface of the thick portion 8*a* of the wall 8 and extends flush with the outer flat surface of the diaphragm 7. The end portions of the outer shell are held out of contact with the diaphragm 7 by reason of the fact that the outside diameter of the thick portion 8*a* of the wall 8 is larger than the diameter of the diaphragm 7. This method as just before described of mounting a hybrid device is particularly advantageous in that the "plane" of mounting i.e. the plane A—A shown in FIG. 2 lies in or near the neutral plane of piezoceramic element 5. This reduces stresses on the ceramic (due to mounting) and reduces the risk of fracture. The transducer shown in FIG. 3 includes a hybrid device mounted at each end in a manner described above. This transducer is intended for the transmission of sound into water and in order to waterproof the arrangement a gasket of neoprene rubber (not shown) may be fitted in the groove 9 and the whole transducer with the exception of the outer transmission faces of the diaphragm 7 may be coated with a plastic skin.

In deep water applications of such a transducer the hydrostatic pressure causes static bending of the metal diaphragm 7. This in turn causes a tensional stress in the ceramic disc 5 which is bonded to it and renders the disc more liable to fracture. In such applications the ceramic disc 5 could be bonded to the outside of the metal plate instead of the inside still using the same method of mounting. The advantage of bonding to the outside of the diaphragm is that the ceramic would then be under compressional forces (both due to stresses from the plate and the hydrostatic pressure) and under such forces it exhibits considerably greater resistance to fracture. Alternatively, it is envisaged that in some applications a piezoceramic element may be bonded to each side of the diaphragm. The metal of the diaphragm may be for example stainless steel or some other metal chosen in accordance with the intended application of the transducer; the type of metal used having a considerable effect on the frequency respone of the transducer.

Figure 4:
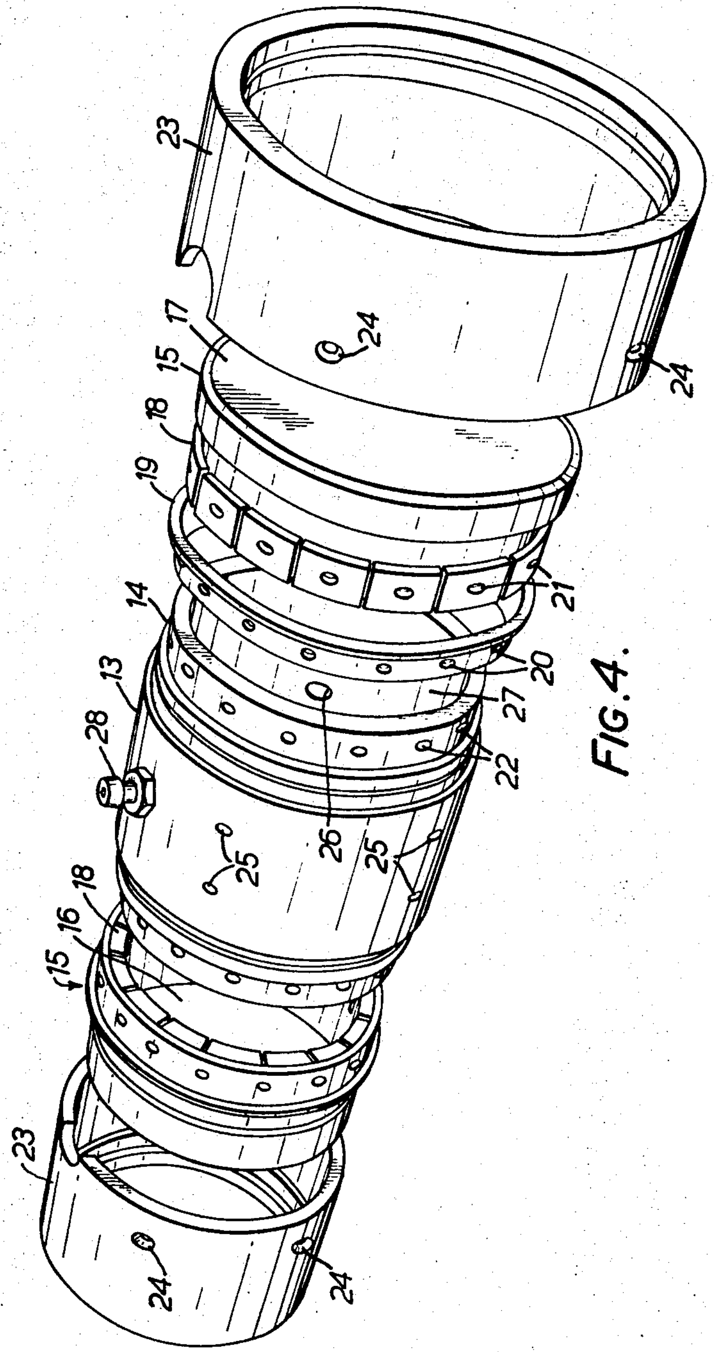
FIG. 4 is a perspective view of a transducer similar to that of FIG. 3.

In FIG. 4 there is shown an alternative form of transducer construction which is generally similar to FIG. 3 but which is more suitable for high frequency operation at or around 10K Hz. It has been found that for operation at these frequencies, severe transducer casing vibration may result unless it is arranged that the mass of the transducer support structure is large compared with the mass of the transducer diaphragm. A reasonable working ratio of support structure mass to diaphragm mass has been found to be about 10:1.

This mass ratio has been achieved in the transducer arrangement as shown in FIG. 3 by providing a substantially solid centre portion 13 having at each end thereof collar portions 14 to which a transducer assembly 15 is secured. Each transducer assembly 15 comprises a ceramic disc 16 secured to a metal front plate 17 which is fixed to a slotted support collar 18 in a manner similar to the constructional arrangements described with reference to FIG. 3. Each collar 18 carries around its outside surface a sealing band 19 which serves for water proofing purposes. The inside surface of the slotted collar 18 is fitted tightly over one collar 14 of the centre portion 13. Each of the collars 18 is secured to one of the collars 14 of the centre portion by means of screws (not shown) which extend through clearance holes 20 and 21 in the sealing band 19 and the slotted collar 18 respectively and into suitably tapped holes 22 in the appropriate collar 14. The whole transducer assembly is finally sealed by two generally cylindrical half shells 23 having clearance holes 24 formed therein which align with tapped holes 25 in the centre portion, screws (not shown) being entered through the aligned holes and tightened.

In order to provide for electrical connection to each transducer diaphragm 16 after the manner described with reference to FIG. 1 and FIG. 2 an axially disposed hole 26 is provided between re-entrant conical end faces 27 (only one of which is shown) of the centre portion 13. The hole 26 connects with a bore which extends radially into the centre portion 13 from a terminal device 28. Electrical conductors are thus passed from the diaphragm along the hole 26 and through the bore to connect with the terminal device 28.

It will be appreciated that perfect sealing of the arrangement may be achieved by means of suitable rubber gaskets thereby to render the transducer suitable for deep water applications and it will also be appreciated that various constructional variations may be effected for example by utilising alternative diaphragm constructions and other alternative constructional configurations as described with reference to FIG. 3.

What I claim is:

1. A hybrid piezoelectric device comprising a piezoelectric element, a metal diaphragm of similar thickness to said element and to which said element is bonded, a metallic coating on a face of said element opposite to said diaphragm and constituting one electrode of the device, another electrode being defined by said diaphragm a wall inset from the edges of said diaphragm, junctioned to said diaphragm and extending perpendicularly from said diaphragm on the side thereof to which said element is bonded, said wall being out of contact with said element and enclosing said element within its confines, the junction between said wall and said diaphragm being in the same plane as the bond between said element and said diaphragm, said wall having a first region which is thinner than said diaphragm at the junction therebetween and having a relatively thicker region at its end which is remote from said diaphragm, said thicker region being adapted to facilitate fixing of said device to a body structure.

2. A transducer including two devices each as claimed in claim 1, wherein the said thicker region of the wall of each device is provided with holes receiving means securing said devices at each end of a hollow cylindrical body structure and wherein slots are defined in said wall at intervals therealong, said slots being disposed parallel to the axis of said structure and orthogonally to said diaphragm.

References Cited

UNITED STATES PATENTS

| | | | |
|---|---|---|---|
| 3,360,664 | 12/1967 | Straube | 310—8.2 |
| 2,834,952 | 5/1958 | Harris | 310—8.74 X |
| 3,382,841 | 5/1968 | Bouyoulos | 310—8.3 X |
| 3,433,461 | 3/1969 | Scarpa | 310—8.2 X |
| 3,320,578 | 5/1967 | Aherns et al. | 340—10 X |
| 3,341,721 | 9/1967 | Vincent | 310—8.6 |
| 2,487,962 | 11/1949 | Arndt | 310—8.7 X |
| 3,198,489 | 8/1965 | Finch | 310—8.2 X |

MILTON O. HIRSHFIELD, Primary Examiner

B. A. REYNOLDS, Assistant Examiner

U.S. Cl. X.R.

310—8.5, 9.1; 340—10